June 14, 1960

R. B. HARTMAN II 2,941,065

STUD WELDING APPARATUS

Filed Feb. 26, 1958

INVENTOR.
ROBERT B. HARTMAN II
BY John H. Lewis Jr.
Harry E. Braddock
ATTORNEY

June 14, 1960

R. B. HARTMAN II 2,941,065

STUD WELDING APPARATUS

Filed Feb. 26, 1958

INVENTOR.
ROBERT B. HARTMAN II

BY John H. Lewis Jr.
Harry E. Braddock

ATTORNEY

United States Patent Office 2,941,065
Patented June 14, 1960

2,941,065

STUD WELDING APPARATUS

Robert B. Hartman II, Bridgeport, Conn., assignor to Remington Arms Company, Inc., Bridgeport, Conn., a corporation of Delaware Filed Feb. 26, 1958, Ser. No. 717,634

4 Claims. (Cl. 219—98)

This invention lies in the field of electric arc welding and is primarily directed to a portion thereof known as stud welding which is concerned with the end welding of elongated stud or pin elements to other work pieces.

My improved stud welding apparatus is more particularly related to the known stud welding process in which a slag-forming or flux-forming solid body having a passageway therethrough is placed on a workpiece, a second workpiece or stud is inserted in the passageway against a stop shoulder spaced from the other end of the passageway and the workpiece surface. The stud is firmly held against the stop shoulder in the slag-forming body by means urging the stud toward the workpiece. Electric current is passed through the workpiece, slag-forming body, and stud to initiate an arc between the stud and workpiece in the passageway through the slag-forming body. When the heat of the arc has deteriorated the stop shoulder in the passageway, the softened stud is brought into contact with the partly molten workpiece by the means urging them together to form the weld. The current is shut off shortly thereafter. Issued patents, 2,510,000, dated May 30, 1950, 2,509,999, dated May 30, 1950, 2,587,251, dated February 26, 1952, 2,643,319, dated June 23, 1953, and 2,755,164, dated July 17, 1956, all in the name of Van Der Willigen, disclose the process with which the present invention is involved.

Ordinarily some form of tool or means is provided for holding the stud and slag-forming element in position for applying the force to thrust the stud and workpiece into contact with each other when the intervening slag-forming element gives way, and for supplying the current needed at the necessary voltage to initiate the arc and heat the workpiece.

It is one object of this invention to provide an improved stud welding tool for carrying out the functions outlined in the preceding paragraph, as well as others to be discussed hereinafter, in an efficient, useful and novel manner.

It is an object of this invention to provide an improved stud welding tool which utilizes spring means to force the stud toward the workpiece without frictional forces which have in varied forms adversely affected previous tools of this type.

It is a further object to provide a stud welding tool with novel and effective control circuitry.

It is a further object to provide an improved portable stud welding tool which is capable of one-handed operation and control, light in weight and with greater safety of operation.

It is a further object to provide an improved stud welding tool which will insure that the stud being welded is applied to the workpiece surface in a direction perpendicular thereto.

It is a further object to provide an improved stud welding tool which is economical to produce, requires lesser degree of maintenance, is of smaller size and is simpler to operate than those heretofore known.

It is a further object to provide an improved stud welding tool which can be remotely controlled for work in difficultly accessible locations.

These and other objects will appear from the following description and appended claims.

I attain the above objects by means, preferred froms of which are illustrated in the accompanying drawings in which.

Figure 8:
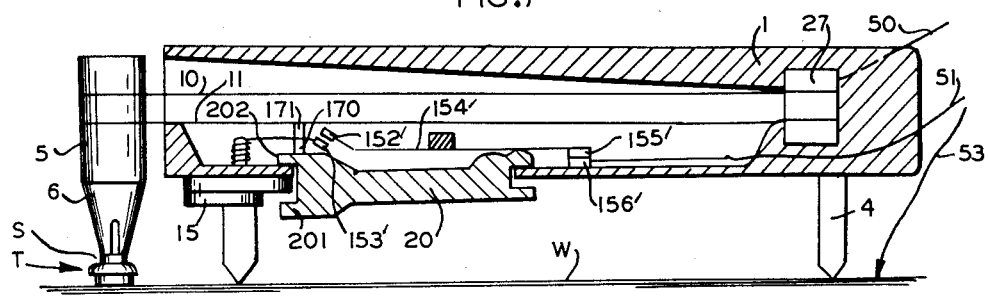

Figure 8 is yet another schematic side view of the tool partly in section to illustrate the position of the parts when the tool, stud and slag-forming element are held in operative position against a workpiece and the stud has moved against the workpiece after passing through the slag-forming element under the spring action which movement opens the contacts to shut off the current and end the cycle.

Figure 9:
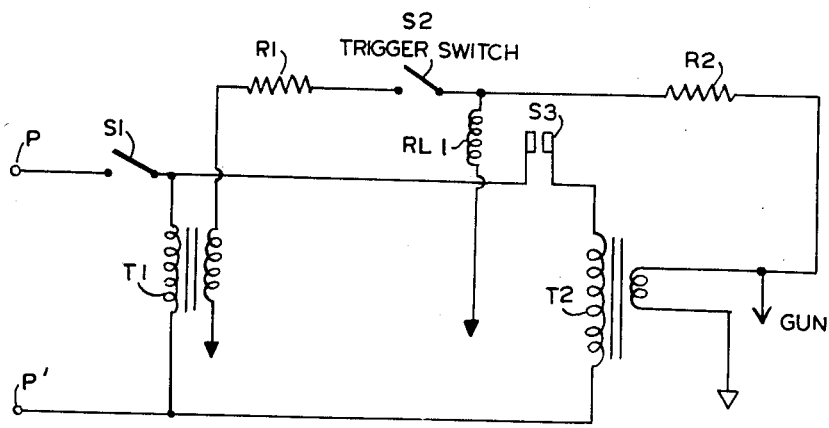

Figure 9 is a circuit diagram showing a modified control circuit and main power circuit controlled thereby for single phase operation.

Figure 10:
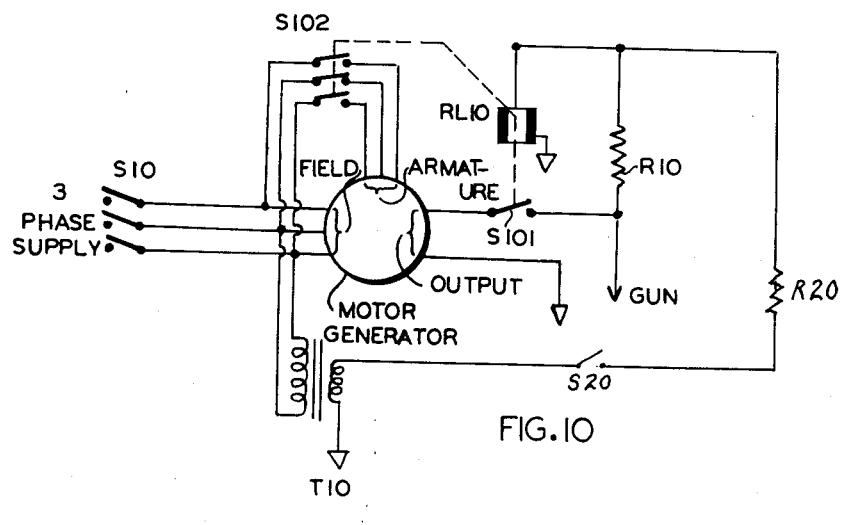

Figure 10 is a circuit diagram showing a modified version of control circuit and main power circuit utilizing three phase supply and a motor-generator arrangement.

Figure 11:
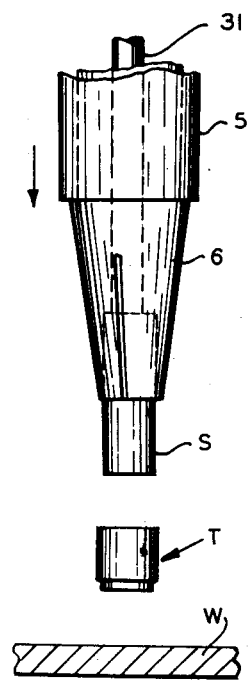

Figure 11 is a partial enlarged side view of the tool chuck assembly holding a stud therein, a slag-forming element and a workpiece to show the relationship before assembly.

Figure 12:
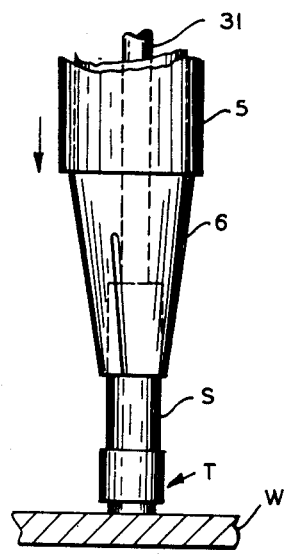

Figure 12 is a partial enlarged side view of the tool chuck assembly holding a stud which is engaged with the slag-forming element and held in operative position against a workpiece.

Figure 13:
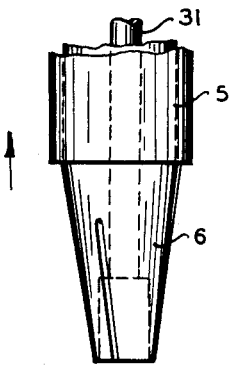

Figure 13 is a partial enlarged side view of the tool chuck assembly withdrawn from the stud which is shown in welded position to the workpiece, stud and workpiece shown in section and stud protrusion as indicated.

Figure 14:
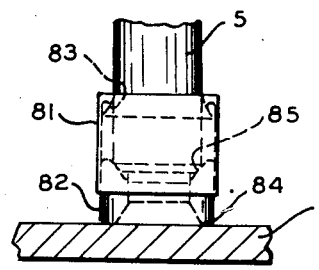

Figure 14 is a further enlarged side view of a stud and slag-forming element in operative engagement with each other and the workpiece.

Generally speaking the present invention involves an electric arc welding process and equipment for end welding metallic fastener pins or studs to metallic work pieces or surfaces. The process calls for the stud to be positioned adjacent to the workpiece in the desired fastening location, application of a sufficient voltage across the stud and workpiece to initiate an arc between them, and after a definite period of time in which the end of the stud and the impact area on the workpiece are heated by the current to a somewhat molten state, sharply forcing the end of the stud into the impact area on the workpiece to form the weld joint at which time the electric current is cut off.

More specifically the present invention relates to a known form of this process, as disclosed in the above mentioned patents to Van Der Willigen, in which the time period, during which the arc and current are maintained, is controlled by a fusible flux-forming or slag-forming element T with a passage therethrough positioned between the stud S and the workpiece W. As indicated in the referenced patents this timer or slag-forming element T is capable of conducting electrical current in at least one direction and also by means of a passageway with an abutment is capable of supporting the stud S which is backed up by a spring means forcing the stud S against the timer element T and toward the workpiece W. The relative positions of these elements with the stud held in the chuck of the welding tool are disclosed in Figures 11, 12, 13 and 14. The dimensions indicated by the reference character "X" in Figure 13 represents the stud "protrusion" into the workpiece. This protrusion distance may be varied as required in a manner fully disclosed at another point in this specification. Continuing with a general description of the process with which the present invention is related, upon application of the voltage across the stud S, timer element T and workpiece W, a current is at first conducted through the slag-forming timer element T and later directly between the stud S and workpiece W, in the form of an arc which is set up in the central passageway in the timer element T. The arc accomplishes two things principally, the first is the softening of the end of the stud nearest the workpiece and also of the impact area on the workpiece; the second is the deterioration of the flux-forming timer element T to the point where it can no longer prevent the spring-urged stud from moving into contact with the impact area on the workpiece. The impact of the softened end of the stud S into the softened impact area on the workpiece W results in the fusing of the stud to the workpiece forming the weld. Simultaneously with stud movement, or shortly thereafter, the current is cut off to complete the cycle of operation.

The workpiece term referred to means any metallic surface or member to which it is desired to attach a stud or fastener pin which is also metallic in composition.

The studs or fastener pins are metallic and may be of any desired form, the most usual being cylindrical, and sometimes having screw threads at one end thereof.

The slag-forming or flux-forming timer element T, hereinafter referred to as the timer element, is an important unit in carrying out the welding process. An enlarged showing of a timer element in cooperative association with the end of a stud is shown in Figure 14.

The main component of the timer element is the solid refractory material portion 82 of conductive or semi-conductive composition. Examples of this composition are known and disclosed in the above referenced patents. The portion of refractory material is provided with a central passageway 84 therethrough. In the passageway is formed a supporting shoulder 85 or abutment for receiving and supporting one end of a stud S. A paper or cardboard collar 81 is secured to the exterior of refractory material portion 82 of the timer. The extremity of said collar being folded inwardly through an angles of about 180 degrees forms a means 83 for frictionally securing the timer and collar to the end of a stud in operative position for carrying out the welding process. The timer assembly T is secured to the end of the stud S so that the axis of the stud is aligned with the passageway 84 through the timer and the end of the stud S is engaged with the shoulder 85 in this passageway to limit movement of the stud into the passageway. The timer element conducts the current initially, assists in initiating the arc between the stud end and the workpiece, and after the arc is set up contains the arc and performs a shielding function during the welding operation. However the most important function performed by the timer element is its controlled deterioration by the arc to the point at which the shoulder 85 disappears to release the stud to strike against the workpiece. By carefully controlling the composition and dimensions of the timer element, for a given voltage, the time of duration of the arc and consequently the degree of heating of the stud and workpiece can be very accurately controlled without any additional or exterior timing or control means to make proper welds.

Turning now to the equipment or tool by which the process is carried out, this unit generally consists of a chuck or holding device for one end of the stud, means for forcing the stud toward the work surface, means for allowing support and manipulation by an operator, and the necessary circuit means to apply the voltage and supply the current required to carry out the welding cycle.

The preferred embodiment of the tool of my invention is best shown in Figures 1, 2, 3 and 4 of the drawings.

The stud welding tool or gun comprises a housing of insulating or dielectric material which contains the control mechanism and is formed in two parts, the main housing unit 1 which is of hollow construction, and a side closure panel 2 attached thereto by bolts 3. Electrical conduits 50 and 51 are connected into the housing as will be later disclosed. Conduit 50 provides the main power for welding process while smaller conduit 51 is a part of the control circuit for the main power circuit. A manually actuatable trigger, also made of insulating material, element 20, is mounted in the housing for limited movement.

Projecting from opening 95 at one end of the housing are two parallel leaf spring members 10 and 11 on which is mounted, perpendicularly thereto, cylindrical element 5. Frictionally mounted in one end of cylindrical element 5 is a chuck or stud holding device 6. At the other end of element 5 is secured a conventional clamping assembly consisting of knurled threaded cap element 32 and conical frictional piece 33 for clamping a stud back-up rod 31 in the desired position to limit stud movement into chuck 6.

The housing is provided with a workpiece engaging support 4 which is mounted in holes drilled in the housing. A shield member 8 is also attached to the housing to protect the operator's hand against heat and splattering molten metal and slag. Adjustment means 15 and 17 are also mounted on the housing to permit manual selection of the desired values of stud protrusion and pressure of spring elements 10 and 11.

The housing is shaped and dimensioned so as to be easily and comfortably manipulated by the human hand as illustrated in the drawings.

The conduits 50 and 51 are led from a power supply unit usually at some distance from the work location. The main power conduit 50 is connected to the secondary winding of the supply transformer.

The control conduit 51 is part of a low voltage circuit which actuates a solenoid to operate the main power control switch in the supply transformer primary winding input circuit. Accordingly, closing of the control circuit actuates the solenoid or relay to energize the main power transformer primary windings which applies the main power output from the transformer secondary windings to the gun and stud to be welded. Other circuit arrangements may be used as will appear in the following disclosure.

Figure 1:
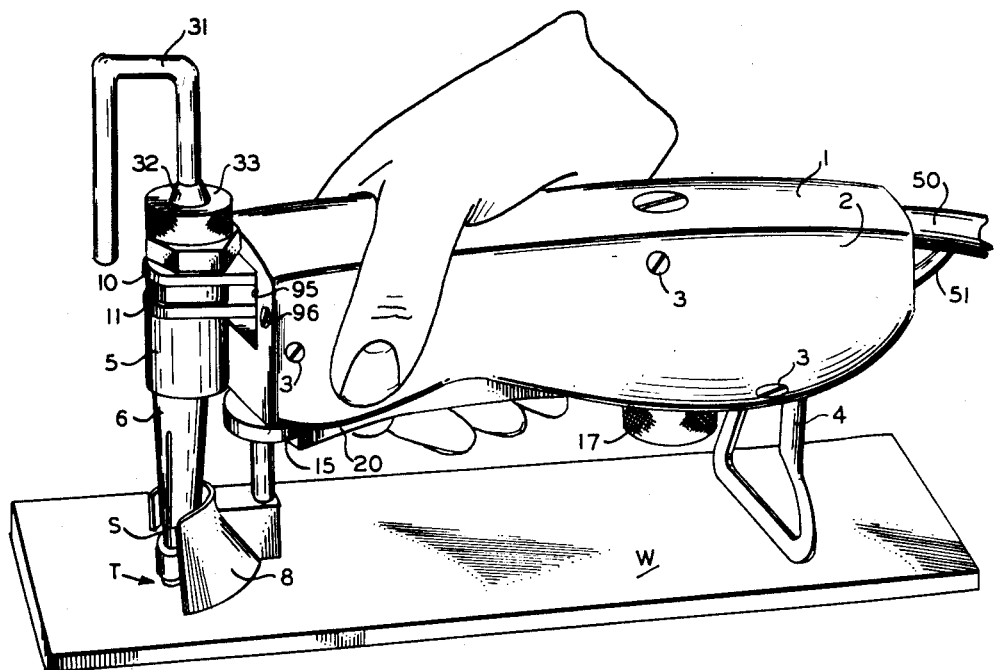
Figure 1 is a general perspective view of a stud welding tool embodying the features of my invention held in operative position against a work surface and showing the stud associated with the slag-forming element.
Figure 2:
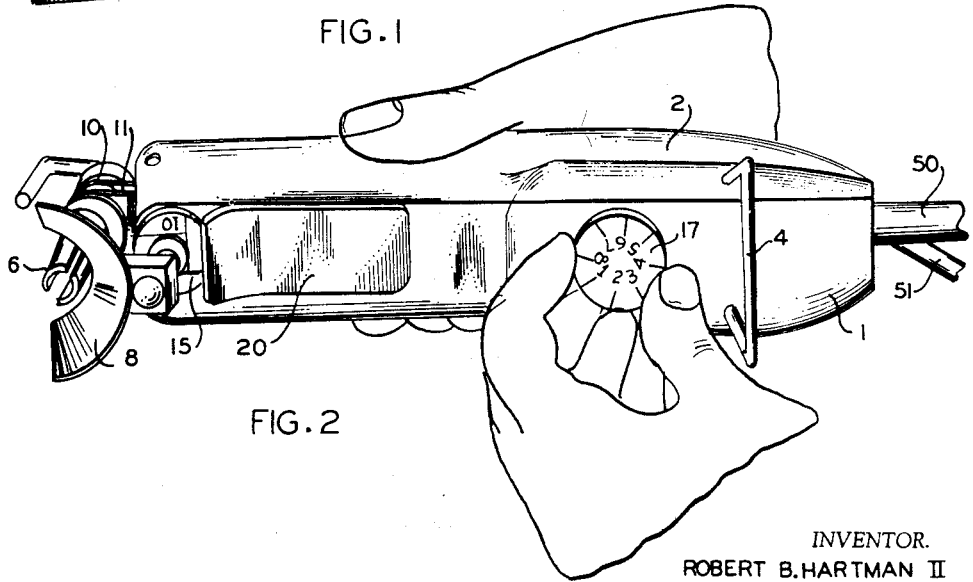
Figure 2 is a general perspective view of the bottom of the tool shown in Figure 1 showing the two adjustment devices for setting stud protrusion and spring pressure.
Figure 3:
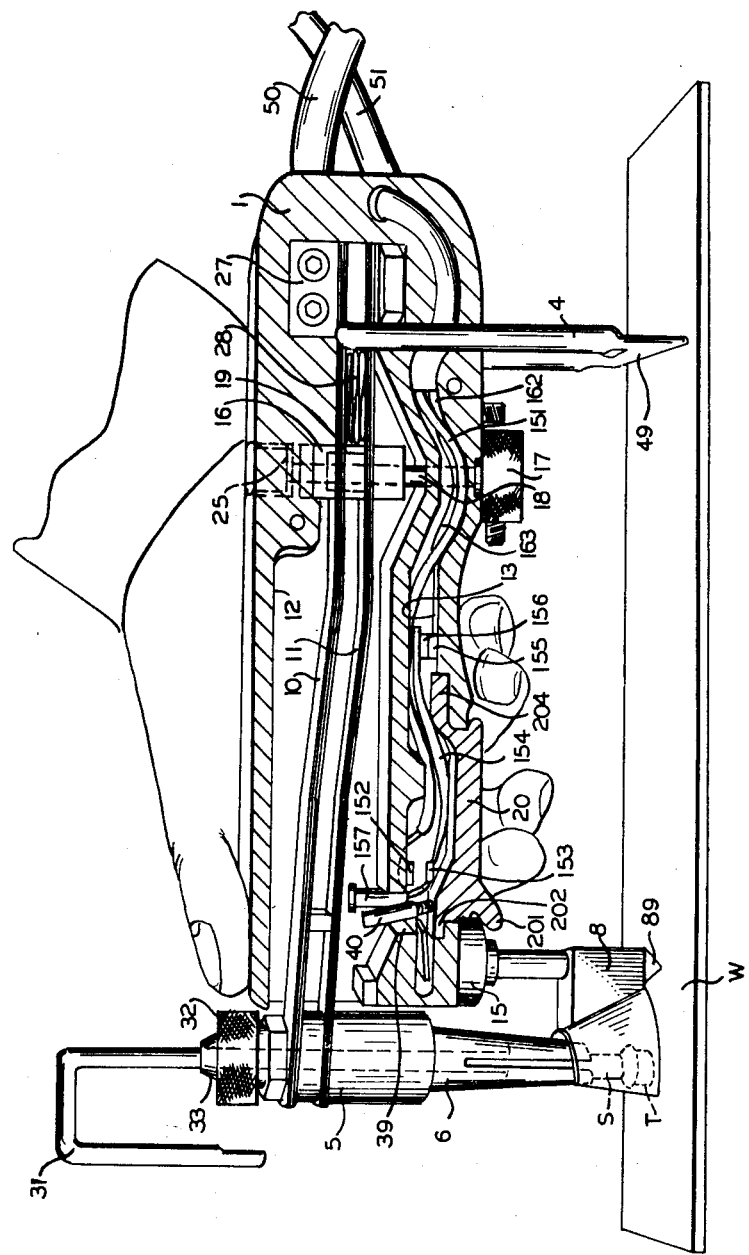
Figure 3 is a general perspective view of the tool held in operative position against a workpiece as shown in Figure 1, except that one of the side panels of the tool has been removed to show the arrangement and cooperation of the working parts of the tool. The parts are shown in positions at the instant of releasing the trigger switch to complete the circuit and start a welding cycle.
Figure 4:
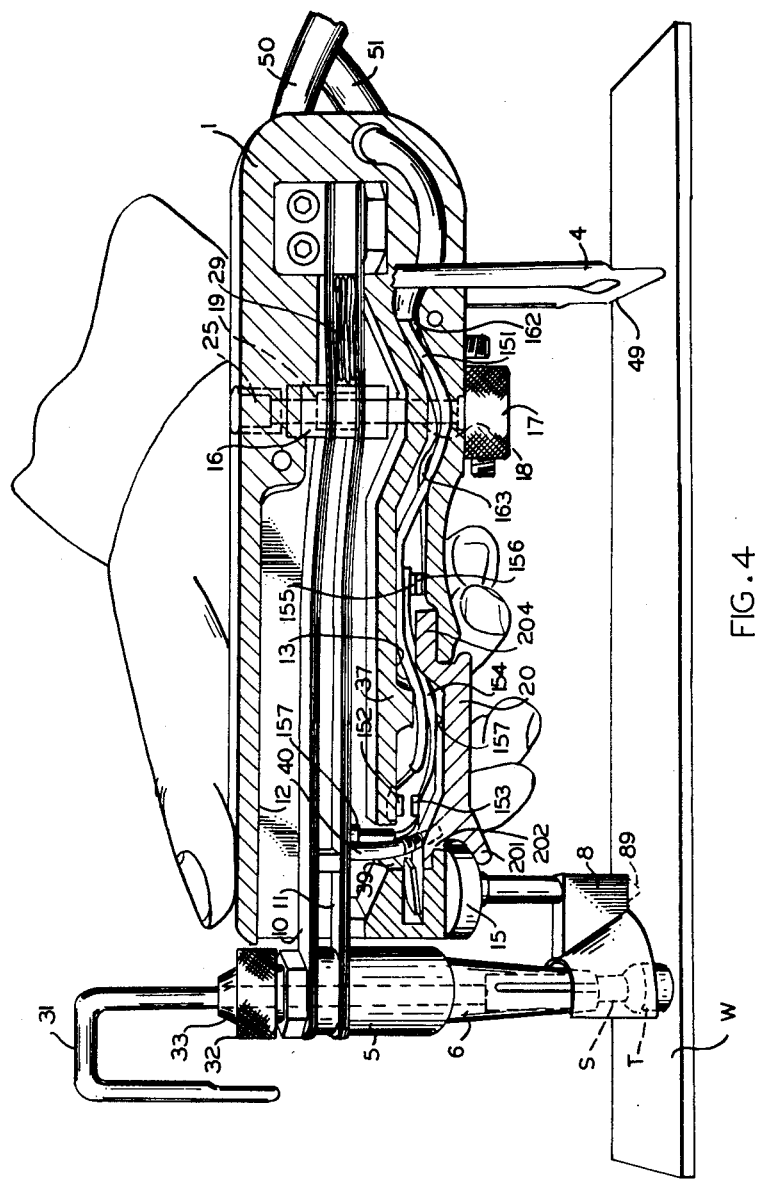
Figure 4 is a view of the tool as illustrated in Figure 3 with the parts in position at a later point in the welding cycle at which the slag-forming element has given way and permitted the stud to be impacted against the workpiece which movement opens the switch to turn off the power to the tool.

Referring now to Figure 3, the tool is there shown with side closure panel 2 removed in order to make clear the arrangement of the interior mechanism. The housing 2 is provided with two hollowed out portions 12 and 13 which may be formed by milling or casting or other suitable means. In the upper hollowed out portion 12 is mounted a spring assembly consisting of two parallel composite metallic spring elements 10 and 11 which are secured at one end by suitable means into terminal block 27. Terminal block 27 is connected to main power conduit 50. The other end, the spring assembly projects outwardly through the opening 95 in the end of the housing to support the chuck assembly 5 and 6. The spring assembly is constructed to bias the chuck assembly toward the workpiece W as seen in Figure 3. The spring pressure may be varied by means of a slidable E-shaped block 16 through a portion of which the spring elements 10 and 11 pass. The block 16 is shifted by means of interengaging threaded portions on a rotatable shaft 18 and the block. The shaft 17 is rotated as desired by means of a knurled knob 17 on the underside of the tool. It is to be noted that the parallel leaf spring construction which provides in effect a parallelogram linkage, insures that a stud being welded is moved in a direction always perpendicular to the workpiece surface to achieve the best welds.

The protrusion adjustment is accomplished by rotatable cam element 15 of varying thickness. The abutment 201 of trigger member 20 slidingly engages a side face of the cam element and is positioned thereby as the cam element is rotated to bring portions of varying thickness into alignment with the abutment 201.

Rigidly mounted on the inner surface of trigger member 20 is an upright rod element 40 which projects through an opening 39 in the partition separating the two hollowed out portions of the housing interior. It can be seen from Figure 3 that when the forward end of trigger member is at the lower extreme of its allowable movement as determined by engagement of abutment 202 with the inner surface of the trigger member aperture, that the upper end rod 40 will determine the lower limit of possible downward movement of the spring assembly and chuck assembly because of the abutting of the lower surface of spring element against the upper end of rod 40. This means that the distance that a stud carried by the chuck element 6 will be projected into the softened workpiece during the welding cycle will also be limited thereby. It will be seen that by pressing the trigger element inwardly the rod 40 will move the spring assembly a given amount. This amount will be dependent upon the distance that trigger member abutment 201 can move before it is stopped by cam 15. When it is desired to set stud protrusion distance, a stud is placed in the chuck 6, the trigger member 20 is pressed inwardly to the limit of its movement and held against cam 15 while the tool and stud aligned so that the end of the stud and the two workpiece engaging surfaces 89 and 49 line in a single plane. The release of trigger member 20 will then permit the spring assembly to move the end of the stud past the previously established plane of alignment by the amount of stud protrusion desired. This amount is controlled by the limiting effect of the varying thickness of cam 15 on the upward movement of abutment 201 on the trigger member. The control conduit 51 which is led into housing 1 contains two insulated conductors 151 and 152. Conductor 151 is connected to a contact 152 fixedly mounted on housing partition 37. Fixed contact 152 is positioned to be engaged by a movable member 154. Rigidly attached to one end of member 154 is a rod element 157 which projects upwardly through opening 39 in housing partition 37. Rod element 157 is positioned to be engaged by the spring member 11 of the spring assembly when in its lowermost position. Engagement of rod element 157 by spring element 11 forces the contact 153 on movable member 154 to be moved away from contact 152 to open the control circuit. Movable member 154 is attached at its central portion to partition 37 by fastener 157. The member 154 is provided at its other end with a second contact element 155 which is arranged to engage a fixed contact 156 mounted on a conductor plate 163. Plate 163 is connected to conductor 162 to complete one version of the control circuit of my improved tool. Movable contact element 155 is engaged by portion 204 of the trigger element 20 to open contacts 155 and 156 when the trigger element 20 is depressed inwardly with respect to the tool housing 1.

The operation of the tool as described in Figures 1 through 4 will now be described through one welding cycle.

The main power conduit 50 and the control circuit conduits are connected to a suitable power unit for supplying the desired voltages and currents for operation. Initially the main power conduit, which is connected to the secondary or output windings of the power unit transformer, is not energized since the switch for energizing the primary winding thereof is open under the control of a solenoid which is controlled by the control circuit. Initially, the control circuit is not closed by reason of the spring 11 engaging rod 157 to hold contacts 152 and 153 apart. With no pressure on trigger element 20 contacts 155 and 156 are closed.

The desired spring force setting is made by actuation of knob 17. Usually only three adjustments are necessary: one for using the tool on a floor surface, one for overhead surfaces, and a third for vertical surface work.

The desired protrusion distance is set by adjusting cam knob 15 as previously explained.

Next a stud is placed in the chuck 6 and, with the trigger depressed to displace spring assembly upwardly, a fixed amount (protrusion distance) by means of rod element 40, the stud is axially positioned in the chuck 6 so that the lower end of the stud and workpiece engaging surfaces 89 and 49 lie in one plane.

If it is desired to weld a number of studs of the same length and with the same protrusion distance, the rod 31 may be placed in abutting relation to the upper end of the stud and clamped there by means of threaded lock element 32. Then it will only be necessary to insert the succeeding studs in the chuck until they abut rod 31 and they will be positioned for the desired protrusion distance.

A timer element is now secured to the lower end of the stud by frictional engagement of the timer element inturned paper collar so that the passage in the timer element is in alignment with the stud axis and the bottom of the stud lies against the shoulder in the passageway through the timer element.

The tool is firmly gripped in the operator's hand with the trigger element fully depressed and placed against the workpiece in position to affix the stud as desired. Pressure of the tool against the work will deflect the spring assembly upwardly an amount equal to the heighth of the timer element shoulder from the workpiece. This deflection of the spring element 11 allows member 154 to move to close contacts 152 and 153. With the tool firmly pressed against the workpiece, trigger element 20 is released and moves outwardly with respect to the tool housing allowing contacts 155 and 156 to close. This completes the control circuit which actuates the relay to close the primary circuit transformer windings and energize the secondary windings to which conduit 50, plate 27, springs 10 and 11, the chuck assembly, the stud S and timer T are connected. The initiation of the arc and projection of the stud against the workpiece at the proper time to form a satisfactory weld are set forth in detail in preceding portions of the specification. When the timer element deteriorates to the point at which the springs 10 and 11 project the stud into the workpiece the control circuit is broken by the action of spring 11 moving rod 157 downward to open contacts 152 and 153. This causes the relay which is controlled by the control circuit to open the primary windings of the supply transformer and terminate the supply of power to main conduit 50 to complete the cycle. The timer element is substantially destroyed by the process and the remnants are easily brushed away.

Figure 5:
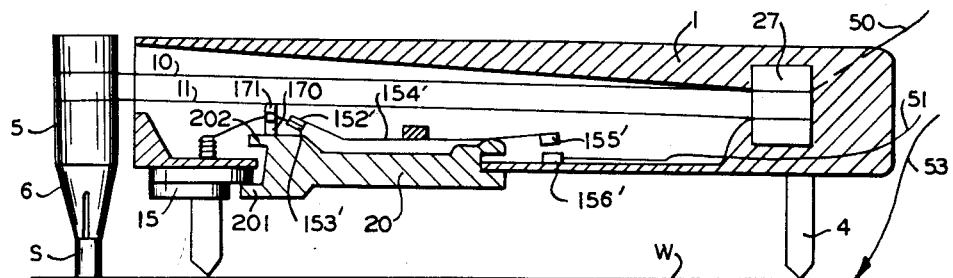
Figure 5 is a schematic side view of the tool partly in section to illustrate the position of the switches and parts when the tool and stud, are held against a workpiece with the trigger element in a position for setting up the protrusion distance of the stud into the workpiece.
Figure 6:
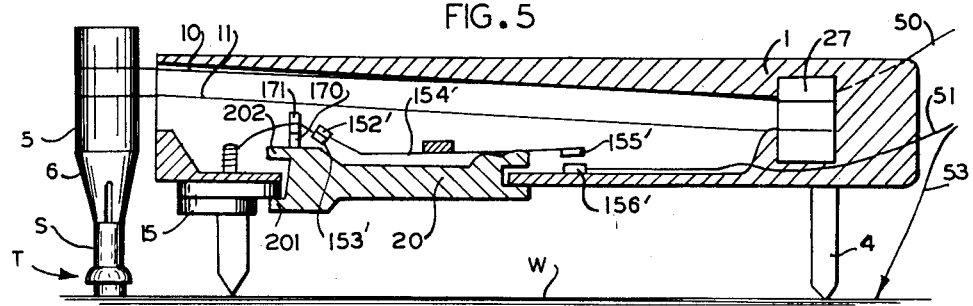
Figure 6 is a schematic side view of the tool partly in section to illustrate the position of the parts when the tool, stud and slag-forming element are held in operative position against a workpiece before the trigger member is released to close the circuit and initiate the welding cycle.
Figure 7:
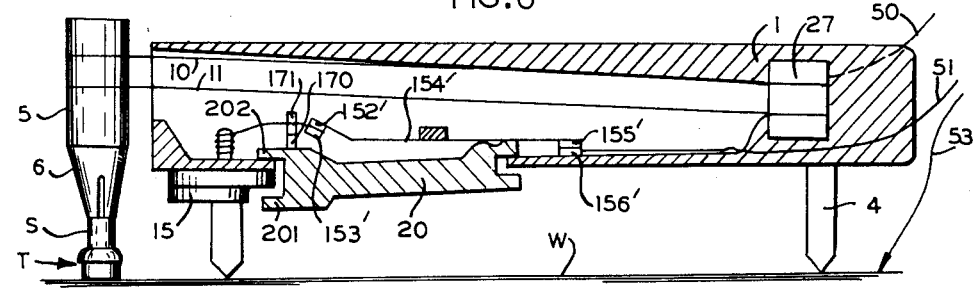
Figure 7 is another schematic side view of the tool partly in section to illustrate the position of the parts when the tool, stud and slug-forming element are held in operative position against a workpiece and the trigger member has moved to the release position to close the circuit and initiate the welding cycle.

Figures 5, 6, 7 and 8 indicate a varied form of circuitry for my improved stud welding tool in which the workpiece is used as the return line or conduit for the control circuit. This arrangement provides added safety features but is not applicable to certain types of welding situations. The tool illustrated schematically is basically the same as that shown in Figures 1, 2, 3 and 4. Figure 5 shows the tool in the position for setting the protrusion distance with the trigger held in the tool housing to keep the trigger contacts in the control circuit open. Figure 6 shows the tool in the "ready to weld position" against the workpiece and timer element. Figure 7 shows the next step in which the welding process is occurring, the trigger element having been released and the trigger contacts permitted to close. The control circuit is completed from the transformer through the trigger switch, through the spring switch contacts 152, 153, through the front leg of the tool and returned to the transformer through the base plate W and ground cable 53. When the stud is projected against the workpiece the spring switch is opened, shutting off the welding current. When this current is used it is essential that the control cable plug be polarized when welding to grounded structures and that the welding source outlet also be polarized so that the ground side of the control circuit connects to the welding ground or workpiece.

It would of course be possible to eliminate from the control circuit the switch contacts which are actuated by the spring element 11 of Figures 1, 2, 3 and 4. This would mean that the current would be cut off either by reactuating the trigger element 20 to open contacts 155 and 156 or by the use of electrical means as illustrated in Figures 9 and 10. Figure 9 relates to single phase operation in which switch S1 represents the switch which introduces power to the control and welding circuits. Control transformer T1 provides low voltage power to the relay coil RL1 through resistance R1 and control trigger switch S2. Resistance R2 in series with the secondary impedance of welding transformer T2 is in parallel with the relay coil RL1. Resistance R1 and R2 are so proportioned that with the circuit as described, relay RL1 is energized when the switch S2 is closed. However, the proportionality is such that if the impedance of transformer T2 secondary is short circuited, as when the stud is welded to the plate, insufficient voltage is present across relay RL1 to maintain it energized, due to the redistribution of currents in the parallel paths. After the closing of master switch S1, the closing of control switch S2 energizes relay RL1. The contacts of relay RL1, S3, are in series with the primary winding of the welding transformer T2. Thus, closing S2 permits the start of welding current flow. The phase of the voltage from T2 is such that it tends to help maintain relay RL1 energized, through resistance R2. However, when the stud drops to complete the weld, the secondary voltage from T2 is short circuited, relay coil RL1 is in parallel with R2 only, and insufficient voltage is present across the relay to keep it energized. On de-energizing the contacts S3 open, thus de-activating transformer T2. The tool trigger switch S2 is normally released or opened before the tool is removed from the welded stud, thus assuring that the welding circuit remains inactive until the trigger is closed again. This circuit automatically shuts off the flow of welding current the instant the weld is completed, thus providing very efficient use of power.

Figure 10 represents a circuit which operates similarly to that of Figure 9 but with a three phase supply acting through a motor generator arrangement in which the operation of the control circuit relay RL10 disconnects the primary of the armature of the motor and connects the auxiliary secondary winding to the welding circuit. This eliminates the welding surge from the power line and requires the flywheel effect of the armature to provide the energy for the weld. Of course, the motor armature need not be disconnected if surge reflection is important. In both Figure 9 and Figure 10 the trigger or control circuit switches are located in the secondary circuit of the control transformer so that it may be in the low voltage grounded circuit rather than in the primary high voltage circuit.

It will be understood by those skilled in the art, upon a study of this disclosure, that my invention permits of various modifications and may be embodied in devices other than those particularly illustrated and described, without departing from the essence of my invention and within the scope of the following claims.

I claim:

1. A compact portable stud arc welding tool of the one hand operated type which utilizes a fusible slag-forming timer element, said tool comprising a single hollow elongated hand grip and housing unit, a stud gripping means movably mounted on said hand grip and housing unit solely for manual actuation thereof, means mounted in said hand grip and housing unit resiliently urging said gripping means toward a workpiece to which the stud is to be welded, fixed workpiece engaging portions on said hand grip and housing unit, electrical circuit means for applying high voltage electric power to said stud to initiate and sustain an electrical arc between the stud and workpiece before contact therebetween, a manually actuatable trigger member mounted on said hand grip and housing unit, said circuit means comprising a first switch means in said hand grip and housing unit actuated by said manually actuatable member to render said circuit means operative, and a second switch in said hand grip and housing unit actuated by movement of said gripping means toward the workpiece to render said circuit means inoperative upon first projection of the stud against the workpiece by said manually actuated stud gripping means.

2. A portable stud arc welding tool for one handed operation of the type which utilizes a fusible slag-forming timer element, said tool comprising a unitary hollow elongated hand grip and housing unit, a stud gripping means movably mounted on said unit, manually actuated means mounted in said unit resiliently urging said gripping means toward a workpiece to which the stud is to be welded, fixed workpiece engaging portions on said unit, electrical circuit means for applying high voltage electric power to said stud to initiate and maintain an electrical arc between stud and workpiece prior to initial contact therebetween, a manually actuatable trigger member mounted on said unit, said circuit means comprising a first switch means in said unit actuated by said manually actuatable trigger member to render said circuit means operative, and a second switch in said unit actuated by movement of said gripping means toward the workpiece to render said circuit means inoperative upon first contact of said stud with said workpiece, said means urging said stud gripping means toward the workpiece comprising at least one leaf spring member fixed at one end to the unit to maintain movement of said gripping means free of frictional forces and maintain the gripping means and stud continuously perpendicular to the workpiece surface.

3. A portable compact stud arc welding tool of the one hand operated type which utilizes a fusible slag-forming timer element, said tool comprising a unitary elongated hollow hand grip and housing unit, a manually actuatable stud gripping means movably mounted on said unit, means mounted in said unit resiliently urging said gripping means toward a workpiece to which the stud is to be welded fixed workpiece engaging portions on said unit, electrical circuit means for applying high voltage electric power to said stud to initiate and maintain an electric arc between said stud and workpiece before said stud initially contacts said workpiece, a manually actuatable trigger member mounted on said unit, said circuit means comprising a first switch means in said unit actuated by said manually actuatable trigger member to render said circuit means operative, and a second switch in said unit actuated by movement of said gripping means toward the workpiece to render said circuit means inoperative at first contact of said stud against said workpiece, said means urging said stud gripping means toward the workpiece comprising a plurality of leaf spring members fixed at one end to the unit to maintain movement of said gripping means free of frictional forces and maintain the positioning of said gripping means and stud always perpendicular to said workpiece surface and stop means for limiting the amount of stud penetration into the workpiece to a predetermined amount.

4. A portable compact stud welding tool of the arc welding type comprising in combination a single combined hand grip and housing unit, a spring manually actuatable assembly mounted on said housing, a chuck means carried by said spring assembly and adapted to engage a stud, electrical means in said housing for conducting electric power to initiate and sustain an arc between a stud in said chuck means and a workpiece to which the stud is to be fastened prior to contact of stud against the workpiece, control means for said electrical means, said spring assembly comprising a plurality of parallel leaf spring elements attached to said housing and said chuck means to insure that stud movement can occur solely in a direction perpendicular to the workpiece surface and without friction.

References Cited in the file of this patent

UNITED STATES PATENTS

| | | |
|---|---|---|
| Re. 22,310 | Nelson | May 11, 1943 |
| 2,110,832 | Hogg et al. | Mar. 8, 1938 |
| 2,115,707 | Crecca et al. | May 3, 1938 |
| 2,342,144 | Hughes | Feb. 22, 1944 |
| 2,421,021 | Ellwood | May 27, 1947 |
| 2,474,340 | Warner | June 28, 1949 |
| 2,474,531 | Keir et al. | June 28, 1949 |
| 2,475,907 | Martin | July 12, 1949 |

FOREIGN PATENTS

| | | |
|---|---|---|
| 167,251 | Australia | Mar. 15, 1956 |
| 762,252 | Great Britain | Nov. 28, 1956 |